Jan. 28, 1969   Z. J. LANSKY ET AL   3,424,185

QUICK EXHAUST VALVE

Filed Nov. 15, 1966

INVENTORS
ZDENEK J. LANSKY
BY KENNETH A. BRACKI

John N. Wolfram
ATTORNEY

United States Patent Office 3,424,185
Patented Jan. 28, 1969

3,424,185
QUICK EXHAUST VALVE
Zdenek J. Lansky, Winnetka, and Kenneth A. Bracki, Mount Prospect, Ill., assignors to Parker-Hannifin Corporation, Cleveland, Ohio, a corporation of Ohio
Filed Nov. 15, 1966, Ser. No. 594,465
U.S. Cl. 137—102                          12 Claims
Int. Cl. F16k *31/145;* F01l *9/02*

This invention relates to valves for directing and exhausting fluid under pressure to and from a fluid pressure operated motor, and more particularly to valves of this type that employ a flexible valve member that flexes to one position for directing fluid to the motor and flexes to another position to exhaust fluid from the motor.

In prior valves of this type the flexible disk is not sufficiently supported and guided so as to provide a long life. It is an object of the present invention to provide such guiding and support.

It is another object to provide a valve of the type described with a muffling chamber exteriorly of the valve exhaust port for muffling the sound of fluid being exhausted to the atmosphere.

It is another object to provide the valve with a muffling chamber having openings to the atmosphere that are directed toward other exterior surfaces of the valve housing to further diffuse and muffle the sound of exhausting fluid.

Other objects of the invention will be apparent from the following description and from the drawings in which.

Figure 1:
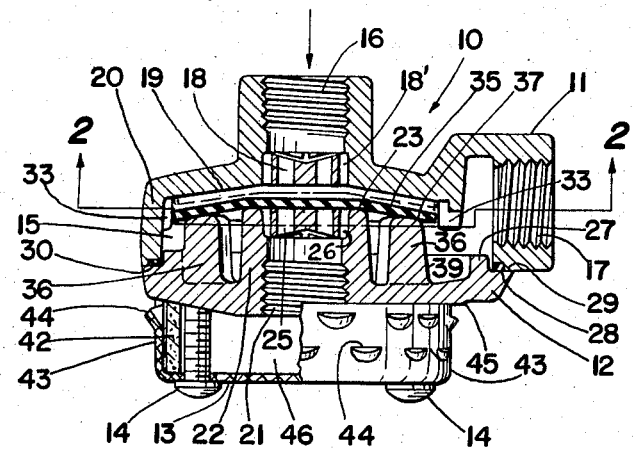
FIG. 1 is a vertical cross-section along the lines 1—1 of FIG. 2.

The valve has a first housing section generally designated 10 and consisting of a body 11 and a cap 12, and a second housing section constituted by a cover 13 that is attached to cap 12 by screws 14.

Figure 2:
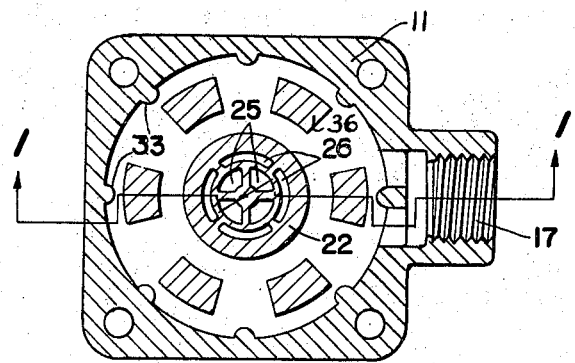
FIG. 2 is a cross-section on the lines 2—2 of FIG. 1.

Body 11 and cap 12 form therebetween a valve chamber 15. Body 11 has an inlet port 16 and a motor port 17 leading from the chamber, the inner end of inlet port 16 having a spider arrangement therein providing a plurality of circumferentially spaced small openings 18 and a plurality of circumferentially spaced small openings 18' concentric with openings 18 adjacent the valve chamber. The radial ribs separating openings 18 from each other are angularly offset from the radial ribs separating openings 18' from each other in the manner shown in FIG. 2 in connection with openings 25, 26, thus to provide better support for diaphragm 35.

Body 11 also has an inlet seat 19 surrounding inlet port 16 and has a side wall 20 around part of chamber 15.

Cap 12 has an outlet port 21 defined in part by an inwardly extending cylindrical wall 22 whose inner end forms an outlet valve seat 23. The inner end of outlet port 21 likewise has a spider arrangement providing a multiple of small openings 25, 26 leading to chamber 15 with the radial ribs between the openings 25 being spaced about midway between the radial ribs that separate openings 26.

Cap 12 has an inwardly extending side wall 27 that forms part of the side wall for chamber 15 that has an end face 28 engageable by the end face 29 of side wall 20 to form a joint between body 11 and cap 12. An O-ring 30 is mounted between the body and cap for sealing such joint.

Body 11 has a series of radially inwardly projecting and circumferentially spaced ribs 33 extending axially inwardly from inlet seat 19, the radially inner faces of the ribs serving to center and guide a flexible valve disk 35.

Cap 12 has a series of circumferentially spaced radially extending abutments 36 extending axially inwardly from the lower end of chamber 15 and having upper surfaces 37 below the plane of outlet seat 23. Surfaces 37 slope downwardly toward their radially outer ends and lie in a cone having its apex on the axis of port 21. The radially outer surfaces 39 of abutments 36 are spaced radially inwardly from ribs 33.

Cover 13 has a porous cylindrical muffler element 42 of foraminous material therein that is clamped between the lower end of cover 13 and the lower end of cap 12 to form a muffling chamber 46. Cover 13 has a cylindrical side wall 43 having a series of circumferentially spaced openings 44 therein, such openings facing cap 12 so that fluid exhausting to the atmosphere therefrom will impinge upon the lower end of cap 12 where the latter radially overlaps cover 13, as shown, to provide more diffusion of the exhausting air.

OPERATION

In operation, the valve has its inlet 16 connected to a source of air under pressure and its motor port 17 connected to one end of a fluid pressure motor. When air under pressure is admitted to inlet port 16 it acts upon valve disk 35 to press its central portion against outlet seat 23 to close outlet port 21 from chamber 15 and also flexes the outer margin of the disk away from inlet seat 19 to permit communication between inlet port 16 and motor port 17 via chamber 15, the fluid at that time passing between ribs 33. In this position of the valve disk, which is illustrated by the solid lines in FIG. 1, abutments 36 contact the disk at a location between the outer margin or periphery of the disk and the central portion that is in contact with outlet seat 23 and the radial and circumferential ribs between openings 25, 26 to support the disk against excessive downward deflection. The extreme outer marginal portion of disk 35 is free of contact with abutments 36 but remains in guiding contact with ribs 33 which axially overlap abutments 36.

When the supply of fluid under pressure is cut off from inlet port 16 and this port is vented to atmosphere, the pressure of fluid in motor port 17 will cause valve disk 35 to flex upwardly to a second position in which the central portion is spaced from outlet seat 23 to permit fluid from motor port 17 to flow into chamber 15 past abutments 36 and through outlet port 21 into muffling chamber 46 from which it passes through element 42 and openings 44 to atmosphere. This second position of the valve disk is shown by the dotted lines of FIG. 1. Upon passing through openings 44, the fluid impinges upon radially projecting transverse surface 45 of cap 12 to further diffuse the escaping fluid.

With the above arrangement the flexible disk is adequately supported and guided against excessive movement and deformation with consequent long life.

I claim:

1. A quick exhaust valve comprising a housing having a valve chamber, inlet and exhaust ports leading from opposite ends of said chamber, a motor port leading from a side wall of the chamber, an inlet seat surrounding the inlet port, an outlet seat of smaller diameter than the inlet seat surrounding the exhaust port, a flexible valve disk between the two seats, said disk when pressure fluid is admitted to the inlet port being flexed thereby to a first position in which its central portion contacts the second seat to close the exhaust port and its outer margin is spaced from the first seat to permit flow of fluid from the inlet port to the motor port, said disk when fluid pressure in the motor port is higher than in the inlet port being flexed by the fluid into a second position in which its outer margin contacts the first seat to close the inlet port and the central portion is spaced from the exhaust port to permit flow of fluid from the motor port to the exhaust port, and circumferentially spaced abutments between the second valve seat and the motor port and opposite said outer margin having inner end surfaces engageable by the disk for supporting the same when the disk is in its first position, said abutments being spaced radially inward of said side wall to permit free flow of fluid around and between the abutments from the motor port to the exhaust port when the disk is in its second position.

2. The valve of claim 1 in which the said inner end surfaces slope so that the radially inner part of the surfaces lie closer to the plane of the outlet seat than the radially outer part of the abutments.

3. The valve of claim 1 in which said inner end surfaces lie in a cone whose apex is on the axis of the outlet seat and is axially inward of the plane of the outlet seat.

4. The valve of claim 1 in which a cylindrical wall projecting into the chamber defines the outlet port and whose inner end constitutes the outlet valve seat, said abutments being radially spaced from both the cylindrical wall and the chamber side wall.

5. The valve of claim 1 in which there are circumferentially spaced ribs projecting radially inward from said side wall for guiding and centering said disk, said ribs axially overlapping said abutments and extending axially beyond said inlet seat for guiding said disk in both said positions.

6. The valve of claim in which one of said inlet and exhaust ports includes a plurality of openings centrally thereof, said openings comprising a first series of circumferentially spaced passages separated by a first set of radially extending ribs and a second series of circumferentially spaced passages radially spaced from said first series and separated by a second set of radially extending ribs angularly offset from said first set, said disk being engageable by said ribs for supporting the same.

7. A quick exhaust valve comprising a body having a valve chamber, inlet and outlet ports leading from opposite ends of the chamber, a motor port leading from the side wall of the chamber, an inlet seat surrounding the inlet port, an outlet seat of smaller diameter than the inlet seat surrounding the outlet port, a flexible disk between the seats, said disk when fluid pressure in the inlet port is greater than in the other ports being flexed thereby to a first position in which its central portion contacts the outlet seat to close the outlet port and its outer margin is spaced from the inlet seat to permit flow of fluid from the inlet port to the outlet port, and when fluid pressure in the motor port is greater than in the other ports being flexed to a second position in which its outer margin contacts the inlet seat to close the inlet port and the central portion is spaced from the outlet seat to open the outlet port to permit flow of fluid from the motor port to the outlet port, circumferentially spaced ribs projecting radially inwardly from the chamber side wall, the radially inner surfaces of said ribs serving as a guide to center said disk.

8. A quick exhaust valve comprising a body having a first section forming a valve chamber and having inlet, outlet, and motor ports leading from the valve chamber, a flexible disk within the valve chamber and flexible by fluid pressure in the inlet port to a position for closing the outlet port and opening the inlet port to the motor port and flexible by fluid in the motor port to another position in which it closes the inlet port and opens the outlet port to the motor port, said body having a second section forming a muffling chamber exteriorly of the outlet port and connected thereto, and a plurality of openings in the housing connecting the muffling chamber to atmosphere.

9. The valve of claim 7 in which the openings are directed toward the first body section.

10. The valve of claim 7 in which the first body section forms a wall of the muffling chamber.

11. The valve of claim 7 in which the first body section is of greater diameter than the second body section so as to radially overlap the same, and form a transverse wall extending radially beyond the second body section, and openings in the side wall of the muffling chamber directed toward said transverse wall whereby fluid ejected from the muffling chamber through said openings impinges against said transverse wall.

12. A quick exhaust valve comprising a body and a cap forming a valve chamber therebetween, inlet and motor ports in said body leading from said chamber, an exhaust port in said cap leading from the chamber, an inlet seat surrounding the inlet port, an outlet seat of smaller diameter than the inlet seat surrounding the exhaust port, a flexible valve disk between the two seats, said disk when pressure fluid is admitted to the inlet port being flexed thereby to a first position in which its central portion contacts the second seat to close the exhaust port and its outer margin is spaced from the first seat to permit flow of fluid from the inlet port to the motor port, said disk when fluid pressure in the motor is sufficiently higher than in the inlet port being flexed by the fluid into a second position in which its outer margin contacts the first seat to close the inlet port and the central portion is spaced from the exhaust port to permit flow of fluid from the motor port of the exhaust port, and circumferentially spaced abutments between the second valve seat and the motor port and opposite said outer margin having inner end surfaces engageable by the disk for supporting the same when the disk is in its first position, said body and said cap each having a continuous side wall surrounding said abutments and spaced radially outwardly thereof, said side walls having sealed end faces forming a joint therebetween.

References Cited

UNITED STATES PATENTS 3,084,707    4/1963    Frye _____ 137—102
3,093,153    6/1963    Horowitz _____ 137—102

FOREIGN PATENTS 748,363    5/1956    Great Britain.

LEONARD D. CHRISTIAN, *Primary Examiner.*

U.S. Cl. X.R.

137—596.13